United States Patent
Cook et al.

(10) Patent No.: US 11,394,316 B2
(45) Date of Patent: Jul. 19, 2022

(54) SYSTEM AND METHOD OF UTILIZING LLC CONVERTERS

(71) Applicant: Dell Products L.P., Round Rock, TX (US)

(72) Inventors: Wayne Kenneth Cook, Round Rock, TX (US); Yang Lei, Austin, TX (US); John J. Breen, Harker Heights, TX (US); Lei Wang, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 197 days.

(21) Appl. No.: 16/856,546

(22) Filed: Apr. 23, 2020

(65) Prior Publication Data

US 2021/0336557 A1    Oct. 28, 2021

(51) Int. Cl.
*H02M 3/335*    (2006.01)
*H02M 7/5395*    (2006.01)
*G06F 1/26*    (2006.01)
*H02M 1/00*    (2006.01)

(52) U.S. Cl.
CPC ............ *H02M 7/5395* (2013.01); *G06F 1/26* (2013.01); *H02M 1/0058* (2021.05)

(58) Field of Classification Search
CPC ...... H02M 1/0058; H02M 7/5395; G06F 1/26
See application file for complete search history.

(56) References Cited

U.S. PATENT DOCUMENTS

| | | | | |
|---|---|---|---|---|
| 5,757,173 | A | * | 5/1998 | Agiman ............. H02M 3/1588 323/282 |
| 2008/0278984 | A1 | * | 11/2008 | Stanley ................... H03F 3/217 363/95 |
| 2016/0197556 | A1 | | 7/2016 | Ivankovic et al. |
| 2017/0244332 | A1 | * | 8/2017 | Leong .............. H02M 3/33523 |
| 2017/0302178 | A1 | * | 10/2017 | Bandyopadhyay ... H03F 3/2171 |
| 2019/0013802 | A1 | * | 1/2019 | Xu ........................... H02J 7/025 |
| 2019/0068071 | A1 | * | 2/2019 | Jia ........................... H02M 1/14 |

OTHER PUBLICATIONS

Di Domenico, F., et al. "600 W Half-bridge LLC eval board with 600 V CoolMOSTM™ C7 and digital control by XMC™." Infineon Technologies, May 2016.

(Continued)

*Primary Examiner* — Harry R Behm
(74) *Attorney, Agent, or Firm* — Baker Botts L.L.P.

(57) ABSTRACT

In one or more embodiments, one or more systems, methods, and/or processes may: receiving, by a first circuit of an inductor-inductor-capacitor (LLC) converter, a pulse width modulation (PWM) signal to control a gate of a metal-oxide-semiconductor field-effect transistor (MOSFET) of a plurality of metal-oxide-semiconductor field-effect transistors (MOSFETs) of the LLC converter; provide, by the first circuit, current to a transformer based at least on amplifications of the PWM by at least one of the plurality of power MOSFETs; determine, by the second circuit, if a voltage value associated with a drain of the power MOSFET is above a threshold voltage value; if so, suppress, by the second circuit, the PWM signal to the gate of the power MOSFET; and if not, permit, by the second circuit, the PWM signal to the gate of the power MOSFET.

11 Claims, 5 Drawing Sheets

(56) References Cited

OTHER PUBLICATIONS

Microelectronics, S. T. "An introduction to LLC resonant half-bridge converter: An2644." Sep. 2008). https://www.st.com/content/ccc/resource/technical/document/application_note/de/f9/17/b7/ad/9f/4d/dd/CD00174208.pdf/files/CD00174208.pdf/jcr:content/translations/en.CD00174208.pdf.
Choi, Won-suk, Sung-mo Young, and Dong-wook Kim. "Analysis of MOSFET failure modes in LLC resonant converter." INTELEC 2009—31st International Telecommunications Energy Conference. IEEE, 2009.
Scuto, Alfio. "Half bridge resonant LLC converters and primary side MOSFET selection.", 2015.

* cited by examiner

SYSTEM AND METHOD OF UTILIZING LLC CONVERTERS

BACKGROUND

Field of the Disclosure

This disclosure relates generally to inductor-inductor-capacitor (LLC) converters and more particularly to mitigating hard switching in LLC converters.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Furthermore, power supply units of information handling systems can include LLC converters.

SUMMARY

In one or more embodiments, one or more systems, one or more methods, and/or one or more processes may receive, by a first circuit of an inductor-inductor-capacitor (LLC) converter, a pulse width modulation (PWM) signal to control a gate of a metal-oxide-semiconductor field-effect transistor (MOSFET) of multiple metal-oxide-semiconductor field-effect transistors (MOSFETs) of the LLC converter; may provide, by the first circuit, current to a transformer based at least on amplifications of the PWM by at least one of the multiple power MOSFETs; may determine, by a second circuit of the LLC converter, a voltage value associated with a drain of the power MOSFET; may determine, by the second circuit, if the voltage value associated with the drain of the power MOSFET is above a threshold voltage value; if the voltage value associated with the drain of the power MOSFET is above the threshold voltage value, may suppress, by the second circuit, the PWM signal to the gate of the power MOSFET; and if the voltage value associated with the drain of the power MOSFET is not above the threshold voltage value, may permit, by the second circuit, the PWM signal to the gate of the power MOSFET.

In one or more embodiments, the one or more systems, the one or more methods, and/or the one or more processes may further provide, by the first circuit, the PWM signal to the second circuit. In one or more embodiments, the second circuit may include a comparator configured to compare a voltage associated with the power MOSFET and a voltage associated with a node of the second circuit; and an AND gate configured to receive signals from the comparator and the PWM signal. In one or more embodiments, suppressing the PWM signal to the gate of the power MOSFET may include the AND gate suppressing the PWM signal to the gate of the power MOSFET. In one or more embodiments, permitting the PWM signal to the gate of the power MOSFET may include the AND gate permitting the PWM signal to the gate of the power MOSFET.

In one or more embodiments, the voltage associated with the node of the second circuit is associated with a voltage divider. In one or more embodiments, the second circuit may further include a diode. For example, the voltage associated with the node of the second circuit may be associated with an anode of the diode. In one or more embodiments, the first circuit may include the second circuit. In one or more embodiments, the first circuit may further include a gate driver configured to receive the PWM signal. For example, the one or more systems, the one or more methods, and/or the one or more processes may provide, by the gate driver, a high-current drive input to the gate the power MOSFET based at least on the PWM signal. In one or more embodiments, a power supply unit of an information handling system may include the LLC converter.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
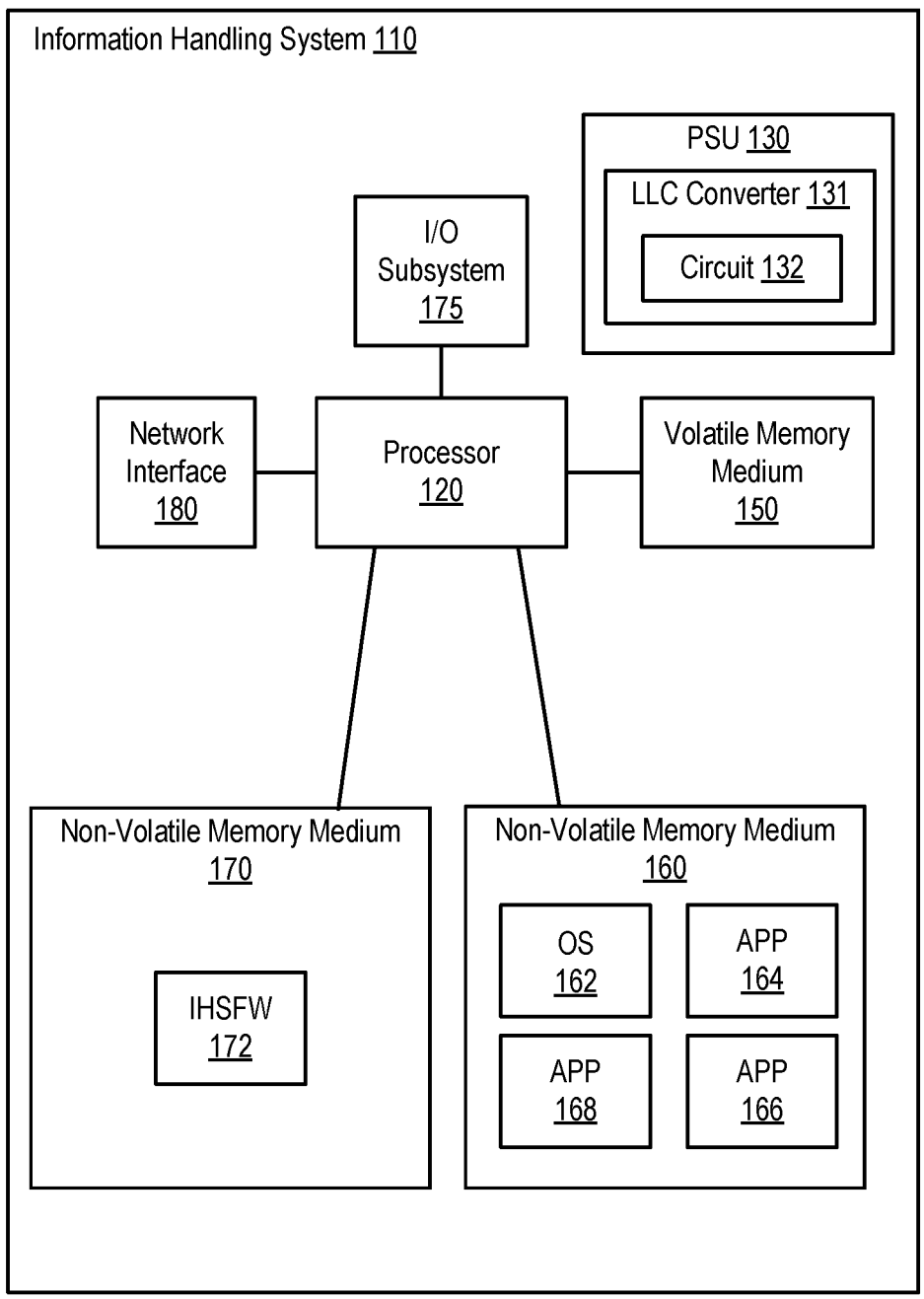
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, inductor-inductor-capacitor (LLC) converters may be utilized in information handling system power supply units (PSUs). As an example, LLC converters may be utilized in server PSUs. In one or more embodiments, LLC converters may be utilized in other technology areas. For example, LLC converters may be utilized in solar power systems and in automobile electrical systems, among others. In one or more embodiments, resonant LLC converters may have high efficiency, low electromagnetic interference (EMI), and high power density, among others, when soft switching is achieved. LLC converters may convert direct current (DC) of a first voltage to DC at a second voltage. Additionally, LLC converters may utilize metal-oxide-semiconductor field-effect transistors (MOSFETs), which may fail due to hard switching at a start up stage. For example, hard switching may occur when voltage and current overlap, in time, as a metal-oxide-semiconductor field-effect transistor (MOSFET) is switched on and off.

In one or more embodiments, a voltage between a drain of a MOSFET and a source of the MOSFET ($V_{DS}$) may indicate an on status or an off status of the MOSFET. When the status of the MOSFET is off, $V_{DS}$ may equal to an input voltage ($V_{In}$). When the status of the MOSFET is on, $V_{DS}$ may be approximately zero volts (0V). In one or more embodiments, a LLC converter may operate at a zero-voltage-switching (ZVS) mode, which may mean a switch (e.g., a MOSFET) of the LLC converter should be on before a turn-on voltage is received. A status (e.g., on/off) of a switch of the LLC converter may be monitored via a $V_{DS}$ detection circuit. For example, a time to send a turn-on voltage may be determined based at least on the status of the switch from the $V_{DS}$ detection circuit. In one or more embodiments, a threshold voltage ($V_{threshold}$) for $V_{DS}$ may be chosen. If $V_{DS}$ is higher than $V_{threshold}$, a gate driver circuit may block a pulse width modulation (PWM) signal and maintain the switch in its off state. If $V_{DS}$ drops to below $V_{threshold}$, the gate driver circuit may enable the PWM signal and permit the switch to turn on. In this fashion, hard switching may be eliminated.

In one or more embodiments, a separate pre-charge circuit for a bootstrap capacitor may be utilized. The pre-charge circuit may charge the bootstrap capacitor above an under-voltage-lockout (UVLO) threshold before the LLC converter starts up. A high-side switch may be turned on at a first pulse of a start-up stage when a voltage across a resonant capacitor is $V_{In}/2$.

In one or more embodiments, a voltage drop of a low-side resonant capacitor may be a cause of hard switching. An initial voltage across the low-side resonant capacitor may be applied before a LLC converter starts up. For example, when the low-side switch is turned on at first to charge up a bootstrap capacitor, the low-side resonant capacitor has enough voltage such that current may be pushed to negative. In one or more embodiments, a voltage sharing resistor may be placed in parallel with each resonant capacitor. A resistance of a high-side resistor may be smaller than a resistance of the low-side resistor such that the initial voltage across the low-side resonant capacitor is higher than $V_{In}/2$. An initial voltage of the low-side resonant capacitor may be set to a voltage that is high enough, such that a voltage of the low-side resonant capacitor is greater than $V_{In}/2$ even after the low-side switch discharged the low-side resonant capacitor for first multiple cycles. This may be equivalent to starting up a LLC converter when a voltage of the low-side resonant capacitor is $V_{In}/2$, which may not encounter a hard-switching issue.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a PSU 130, a volatile memory medium 150, non-volatile memory media 160 and 170, an I/O subsystem 175, and a network interface 180. As illustrated, PSU 130 may include a LLC converter 131. As shown, LLC converter 131 a circuit 132. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches. In one or more embodiments, PSU 130 may provide power to one or more components of IHS 110. For example, PSU 130 may provide power to one or more of processor 120, volatile memory 150, non-volatile memory 160, non-volatile memory 170, I/O subsystem 175, and network interface 180, among others.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 2A:
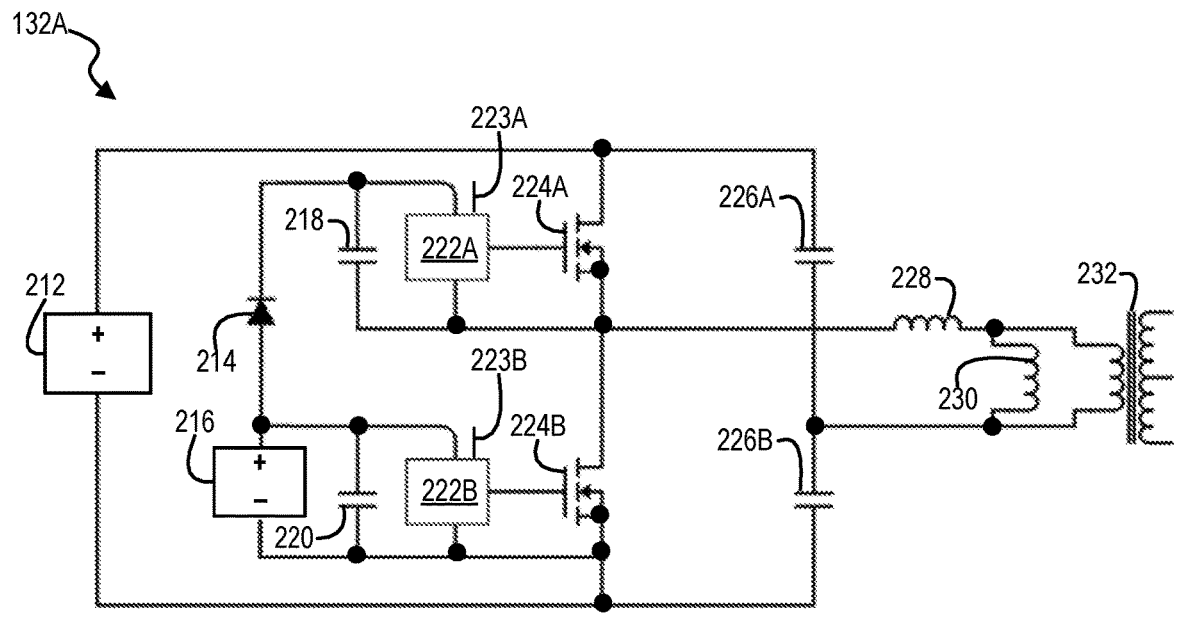
FIG. 2A illustrates an example of a circuit of a LLC converter, according to one or more embodiments.

Turning now to FIG. 2A, an example of a circuit of a LLC converter is illustrated, according to one or more embodiments. In one or more embodiments, PSU 130 may include a circuit 132A. As shown, circuit 132A may include a voltage source 212, a voltage source 216, a capacitor 218, a capacitor 220, gate drivers 222A and 222B, MOSFETs 224A and 224B, capacitors 226A and 226B, an inductor 228, an inductor 230, and a transformer 232. Voltage source 212 may produce $V_{In}$. As illustrated, gate drivers 222A and 222B may respectively include inputs 223A and 223B. In one example, gate driver 222A may receive an input signal via input 223A. In another example, gate driver 222B may receive an input signal via input 222B.

Figure 3:
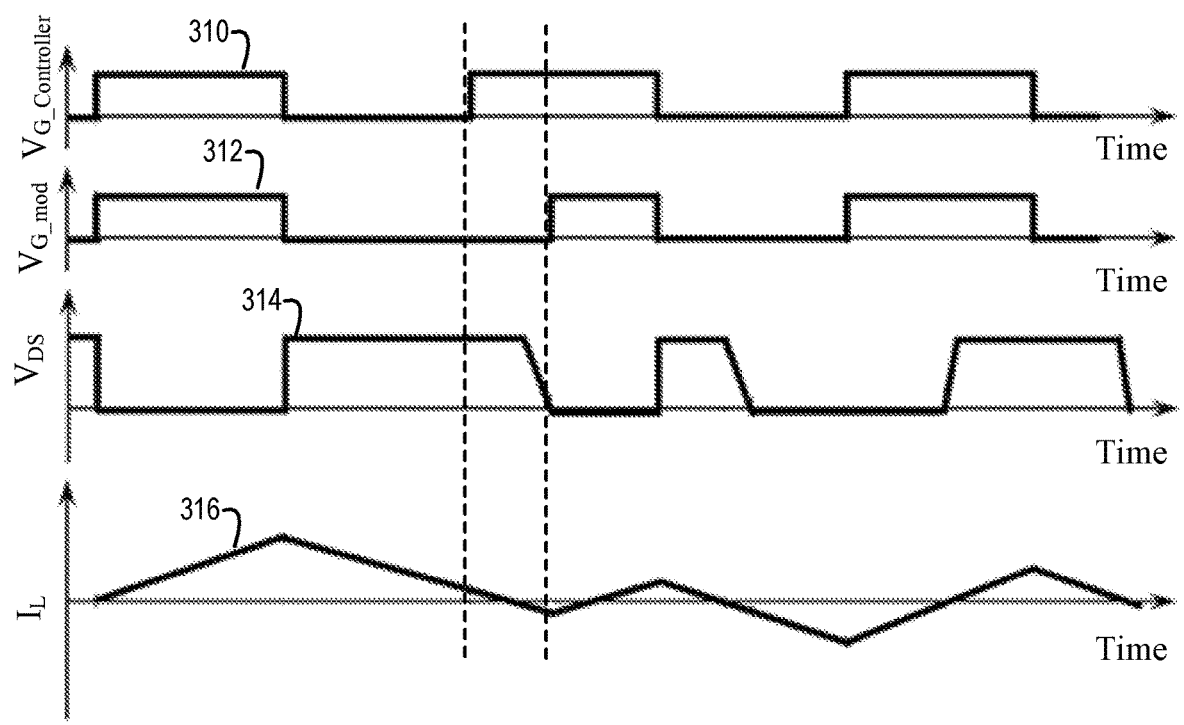
FIG. 3 illustrates examples of waveforms of signals associated with a circuit of a LLC converter.

In one or more embodiments, gate driver 222A may receive a signal 310, as illustrated in FIG. 3. For example, gate driver 222A may provide a signal to a gate of MOSFET 224A based at least on signal 310. For instance, signal 310 may include a PWM signal. Signal 310 may be a fifty percent (50%) duty cycle PWM signal. In one or more embodiments, a MOSFET 224 may be a power MOSFET. A power MOSFET may be a specific type of MOSFET that is designed to handle significant power levels. A power MOSFET may be associated with high switching speed and good efficiency at low voltages.

As illustrated in FIG. 3, a signal 314 may represent $V_{DS}$ of MOSFET 224A. As shown, a signal 316 may represent a current of inductor 228. As illustrated, signal 316 may not be zero (e.g., may not be zero Amperes) when signal 310 may cause MOSFET 224A to turn on. This may cause hard switching to occur, since voltage and current overlap, in time, as MOSFET 224A is switched on and off. In one or more embodiments, a detection circuit may be utilized to monitor $V_{DS}$. Utilizing the detection circuit, signal 312 may be generated. For example, signal 310 may be modified to generate signal 312. In one or more embodiments, signal 310 may be suppressed until $V_{DS}$ is at a threshold voltage. As an example, the threshold voltage may be zero volts (0V).

Figure 2B:
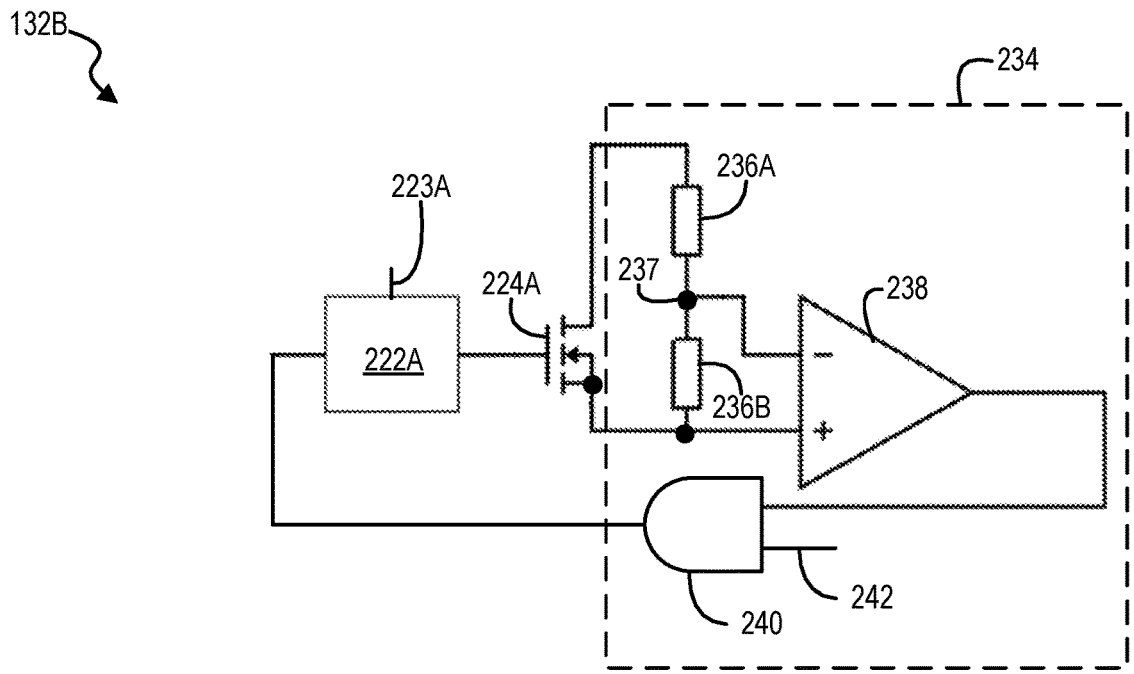
FIG. 2B illustrates a second example of a circuit of a LLC converter, according to one or more embodiments.

Turning now to FIG. 2B, a second example of a circuit of a LLC converter is illustrated, according to one or more embodiments. As shown, a circuit 132B may include a circuit 234. In one or more embodiments, circuit 132B may include circuit 132A and circuit 234. For example, circuit 132B may include a modification of circuit 132A that includes circuit 234. In one or more embodiments, circuit 234 may modify signal 310 to produce signal 312.

As illustrated, circuit 234 may include resistors 236A and 236B, a comparator 238, and an AND gate 240. Resistors 236A and 236B may form a voltage divider. As shown, a negative input of comparator 238 may receive a voltage from the voltage divider. The negative input of comparator 238 may receive a voltage from a node 237 of circuit 234. As illustrated, a positive input of comparator 238 may receive a voltage of a source of MOSFET 224A. If the voltage of the source of MOSFET 224A is greater than the voltage from node 237, comparator 238 may provide a logical "true" signal to a first input of AND gate 240. For example, the logical "true" signal may include a positive voltage above a threshold voltage.

If the voltage of the source of MOSFET 224A is not greater than the voltage from node 237, comparator 238 may provide a logical "false" signal to the first input of AND gate 240. For example, the logical "false" signal may include a positive voltage below a threshold voltage or zero volts (0V). As shown, AND gate 240 may include a second input 242. Signal 310 may be provided to input 242 of AND gate 240. AND gate 240 may provide signal 312 to gate driver 222A. In one or more embodiments, providing signal 312 to gate driver 222A, hard switching of MOSFET 224A may be prevented. For example, circuit 234 may prevent hard switching of MOSFET 224A. In one or more embodiments, gate driver 222A may include circuit 234.

Figure 2C:
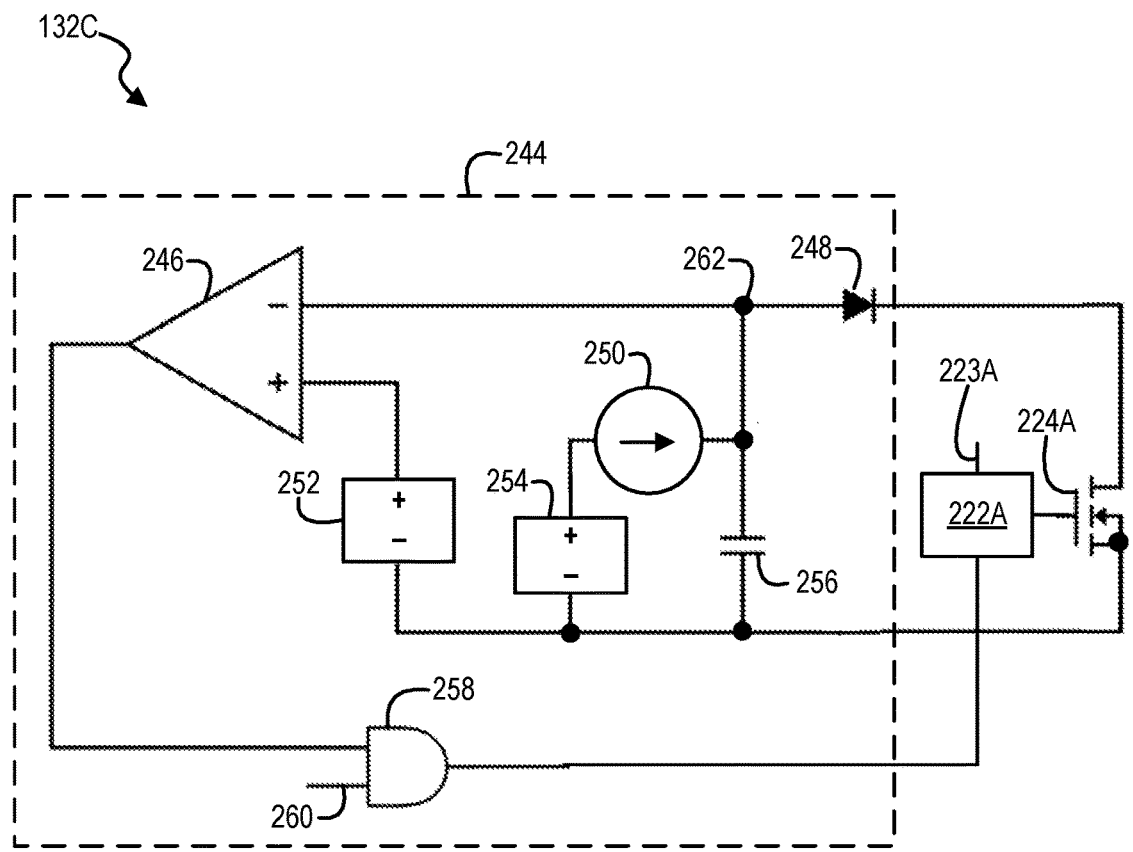
FIG. 2C illustrates a third example of a circuit of a LLC converter, according to one or more embodiments.

Turning now to FIG. 2C, a third example of a circuit of a LLC converter is illustrated, according to one or more embodiments. As shown, a circuit 132C may include a circuit 244. In one or more embodiments, circuit 132C may include circuit 132A and circuit 244. For example, circuit 132C may include a modification of circuit 132A that includes circuit 244. In one or more embodiments, circuit 244 may modify signal 310 to produce signal 312.

As illustrated, circuit 244 may include a comparator 246, a diode 248, a current source 250, a voltage source 252, a voltage source 254, a capacitor 256, and an AND gate 258. In one or more embodiments, voltage source 252 may provide a reference voltage. For example, the reference voltage may be a threshold voltage. Comparator 246 may compare voltage of a node 262 of circuit 244 with the threshold voltage provided by voltage source 252. If the threshold voltage is great than the voltage of node 262 less than, comparator 246 may provide a logical "true" signal to a first input of AND gate 258. If the threshold voltage is not great than the voltage of node 262 less than, comparator 246 may provide a logical "false" signal to the first input of AND gate 258.

As shown, AND gate 258 may include a second input 260. Signal 310 may be provided to input 260 of AND gate 258. AND gate 258 may provide signal 312 to gate driver 222A. In one or more embodiments, providing signal 312 to gate driver 222A, hard switching of MOSFET 224A may be prevented. For example, circuit 244 may prevent hard switching of MOSFET 224A. In one or more embodiments, gate driver 222A may include circuit 244.

Figure 2D:
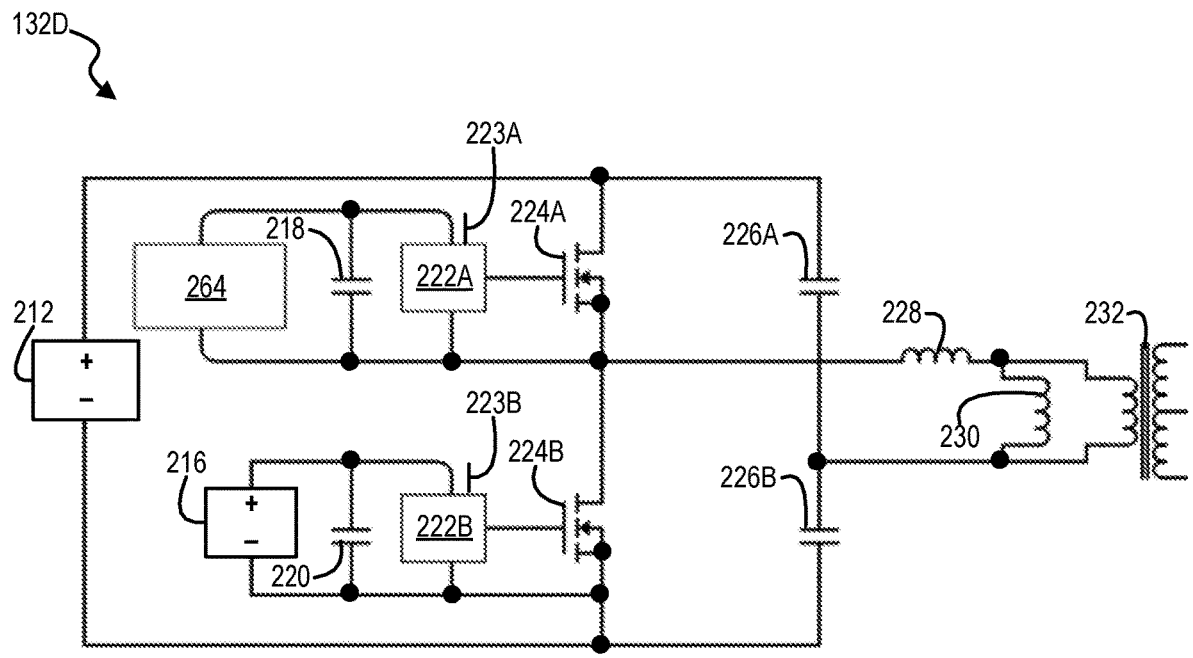
FIG. 2D illustrates a fourth example of a circuit of a LLC converter, according to one or more embodiments.

Turning now to FIG. 2D, a fourth example of a circuit of a LLC converter is illustrated, according to one or more embodiments. As shown, a circuit 132D may include a precharge circuit 264. In one or more embodiments, circuit 132D may include a modification of circuit 132A. For example, circuit 132D may include a precharge circuit 264. In one or more embodiments, precharge circuit 264 may charge capacitor 218 for first multiple cycles of signal 310. In one example, the first multiple cycles of signal 310 may include three cycles of signal 310. In another example, the first multiple cycles of signal 310 may include at least three cycles of signal 310. In one or more embodiments, precharge circuit 264 charging capacitor 218 for first multiple cycles of signal 310 may maintain $V_{DS}$ of MOSFET 224A at zero volts or close to zero volts (e.g., a few millivolts). For example, precharge circuit 264 charging capacitor 218 for first multiple cycles of signal 310 may prevent hard switching at a startup of LLC converter 131.

Figure 2E:
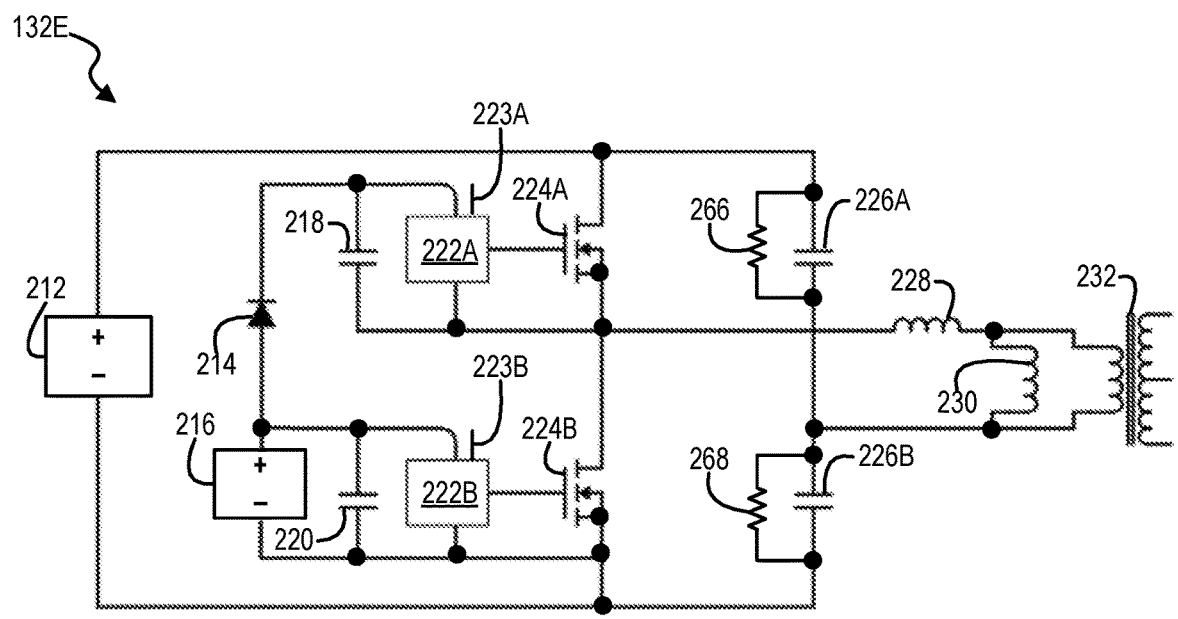
FIG. 2E illustrates another example of a circuit of a LLC converter, according to one or more embodiments.

Turning now to FIG. 2E, another example of a circuit of a LLC converter is illustrated, according to one or more embodiments. Circuit 132E may include a modification of circuit 132A. As shown, a circuit 132E may include a resistor 266 in parallel with capacitor 226A. As illustrated, circuit 132E may include a resistor 268 in parallel with capacitor 226B. In one or more embodiments, power ratings of resistors 266 and 268 may be one Watt. Other power ratings of resistors 266 and 268 may be utilized based at least on an implementation of circuit 132E.

In one or more embodiments, a resistance value of resistor 266 may be less than a resistance value of resistor 268. For example, the resistance value of resistor 266 may be sixty percent (60%) of the resistance value of resistor 268. For instance, the resistance value of resistor 266 may be 150 kΩ and the resistance value of resistor 268 may be 250 kΩ. In one or more embodiments, resistors 266 and 268 may establish different voltages across capacitors 226A and 226B. For example, a voltage across capacitor 226A may be lower than a voltage across capacitor 226B. For instance, the different voltages across capacitors 226A and 226B may establish a voltage imbalance. In one or more embodiments, with the voltage imbalance, the voltage across capacitor 226B may not be depleted during a discharge of capacitor 226B. For example, the voltage imbalance may prevent hard switching at a startup of LLC converter 131.

Figure 4:
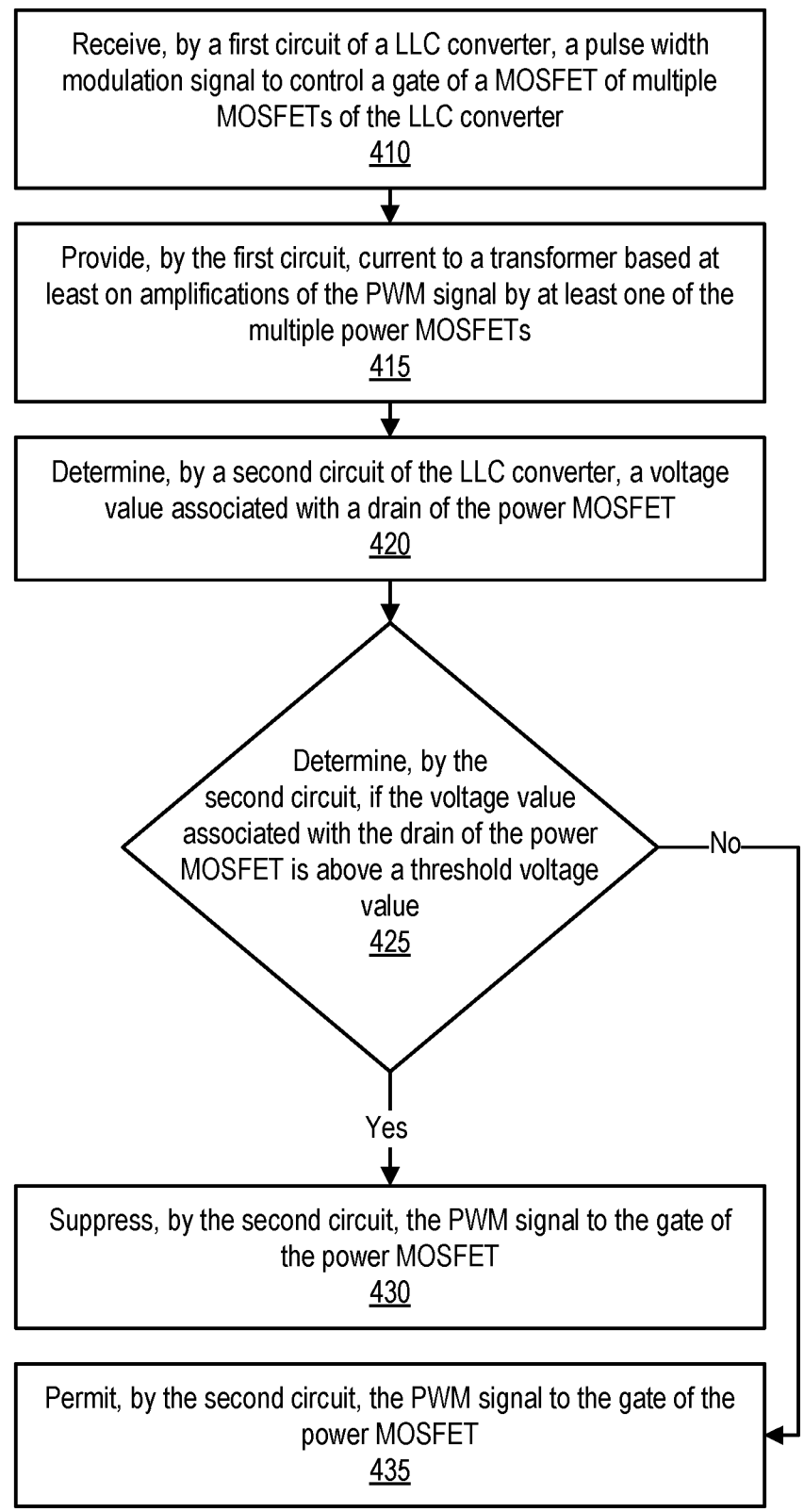
FIG. 4 illustrates an example of a method of operating a LLC converter, according to one or more embodiments.

Turning now to FIG. 4, an example of a method of operating a LLC converter is illustrated, according to one or more embodiments. At 410, a first circuit of a LLC converter may receive a PWM signal to control a gate of a MOSFET of multiple MOSFETs of the LLC converter. For example, circuit 132 may receive signal 310 to control a gate of MOSFET 224A. In one or more embodiments, controlling the gate of MOSFET 224A may include controlling gate driver 222A, which may control the gate of MOSFET 224A. At 415, the first circuit may provide current to a transformer based at least on amplifications of the PWM signal by at least one of the multiple power MOSFETs. For example, circuit 132 may provide current to transformer 232 based at least on amplifications of signal 310 by at least one of the power MOSFETs 224A and 224B.

At 420, a second circuit of the LLC converter may determine a voltage value associated with a drain of the power MOSFET. In one example, circuit 234 may determine a voltage value associated with a drain of power MOSFET 224A. For instance, comparator 238 may determine the voltage value associated with the drain of power MOSFET 224A. Determining the voltage value associated with the drain of power MOSFET 224A may include determining a voltage value associated with node 237. In another example, circuit 244 may determine a voltage value associated with a drain of power MOSFET 224A. For instance, comparator 238 may determine the voltage value associated with the drain of power MOSFET 224A. Determining the voltage value associated with the drain of power MOSFET 224A may include determining a voltage value associated with node 262.

At 425, the second circuit may determine if the voltage value associated with the drain of the power MOSFET is above a threshold voltage value. For example, comparator 238 may determine if the voltage value associated with the drain of the power MOSFET is above the threshold voltage value. In one instance, the threshold voltage value may be a zero voltage value. In another instance, the threshold voltage value may be with a voltage provided by voltage source 252.

If the voltage value associated with the drain of the power MOSFET is above the threshold voltage value, the second circuit may suppress the PWM signal to the gate of the power MOSFET, at 230. For example, circuit 132 may suppress signal 310. In one instance, AND gate 240 may suppress signal 310. In another instance, AND gate 256 may suppress signal 310. In one or more embodiments, suppressing signal 310 may include outputting zero volts regardless of a voltage of signal 310.

If the voltage value associated with the drain of the power MOSFET is not above the threshold voltage value, the second circuit may permit the PWM signal to the gate of the power MOSFET, at 235. For example, circuit 132 may permit signal 310 to the gate of power MOSFET 224A. In one instance, AND gate 240 may permit signal 310 to the gate of power MOSFET 224A. In another instance, AND gate 256 may permit signal 310 to the gate of power MOSFET 224A.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
at least one processor;
a memory medium, coupled to the at least one processor, that stores instructions executable by the at least one processor; and
an inductor-inductor-capacitor (LLC) converter;
wherein the LLC converter includes:
a first circuit that includes a plurality of power metal-oxide-semiconductor field-effect transistors (MOSFETs); and
a second circuit;
wherein the first circuit is configured to:
receive a pulse width modulation (PWM) signal to control a gate of a power metal-oxide-semiconductor field-effect transistor (MOSFET) of the plurality of power MOSFETs; and
provide current to a transformer based at least on amplifications of the PWM by at least one of the plurality of power MOSFETs;
provide the PWM signal to the second circuit;
wherein the second circuit includes:
a diode;
a comparator configured to compare a voltage associated with the power MOSFET and a voltage associated with a node of the second circuit, wherein the voltage associated with the node of the second circuit is associated with an anode of the diode; and
an AND gate configured to receive signals from the comparator and the PWM signal;
wherein the second circuit is configured to:
determine a voltage value associated with a drain of the power MOSFET;
determine if the voltage value associated with the drain of the power MOSFET is above a threshold voltage value;
if the voltage value associated with the drain of the power MOSFET is above the threshold voltage value, suppress the PWM signal to the gate of the power MOSFET, wherein, to suppress the PWM signal, the AND gate is configured to suppress the PWM signal to the gate of the power MOSFET; and
if the voltage value associated with the drain of the power MOSFET is not above the threshold voltage value, permit the PWM signal to the gate of the power MOSFET, wherein, to permit the PWM signal, the AND gate is configured to permit the PWM signal to the gate of the power MOSFET.

2. The information handling system of claim 1, wherein the first circuit includes the second circuit.

3. The information handling system of claim 1, further comprising:
a power supply unit (PSU) configured to provide power to the at least one processor and the memory medium;
wherein the PSU includes the LLC converter.

4. The information handling system of claim 1, wherein the first circuit further includes a gate driver configured to receive the PWM signal and provide a high-current drive input to the gate the power MOSFET based at least on the PWM signal.

5. A method, comprising:
receiving, by a first circuit of an inductor-inductor-capacitor (LLC) converter, a pulse width modulation (PWM) signal to control a gate of a metal-oxide-semiconductor field-effect transistor (MOSFET) of a plurality of metal-oxide-semiconductor field-effect transistors (MOSFETs) of the LLC converter;
providing, by the first circuit, current to a transformer based at least on amplifications of the PWM by at least one of the plurality of power MOSFETs;
providing, by the first circuit, the PWM signal to a second circuit, wherein the second circuit includes a diode, a comparator configured to compare a voltage associated with the power MOSFET and a voltage associated with a node of the second circuit, and an AND gate configured to receive signals from the comparator and the PWM signal, wherein the voltage associated with the node of the second circuit is associated with an anode of the diode;
determining, by the second circuit of the LLC converter, a voltage value associated with a drain of the power MOSFET;
determining, by the second circuit, if the voltage value associated with the drain of the power MOSFET is above a threshold voltage value;
if the voltage value associated with the drain of the power MOSFET is above the threshold voltage value, suppressing, by the second circuit, the PWM signal to the gate of the power MOSFET, wherein the suppressing the PWM signal includes the AND gate suppressing the PWM signal to the gate of the power MOSFET; and
if the voltage value associated with the drain of the power MOSFET is not above the threshold voltage value, permitting, by the second circuit, the PWM signal to the gate of the power MOSFET, wherein the permitting the PWM signal includes the AND gate permitting the PWM signal to the gate of the power MOSFET.

6. The method of claim 5, wherein the first circuit includes the second circuit.

7. The method of claim 5, wherein a power supply unit (PSU) of an information handling system includes the LLC converter.

8. The method of claim 5,
wherein the first circuit further includes a gate driver configured to receive the PWM signal;
the method further comprising:
providing, by the gate driver, a high-current drive input to the gate the power MOSFET based at least on the PWM signal.

9. An inductor-inductor-capacitor (LLC) converter, comprising:
a first circuit that includes a plurality of power metal-oxide-semiconductor field-effect transistors (MOSFETs); and
a second circuit;
wherein the first circuit is configured to:
receive a pulse width modulation (PWM) signal to control a gate of a power metal-oxide-semiconductor field-effect transistor (MOSFET) of the plurality of power MOSFETs;
provide current to a transformer based at least on amplifications of the PWM by at least one of the plurality of power MOSFETs; and
provide the PWM signal to the second circuit;
wherein the second circuit includes:
a diode;
a comparator configured to compare a voltage associated with the power MOSFET and a voltage associated with a node of the second circuit, wherein the voltage associated with the node of the second circuit is associated with an anode of the diode; and an AND gate configured to receive signals from the comparator and the PWM signal; and wherein the second circuit is configured to:
determine a voltage value associated with a drain of the power MOSFET;
determine if the voltage value associated with the drain and the source of the power MOSFET is above a threshold voltage value;
if the voltage value associated with the drain of the power MOSFET is above the threshold voltage value, suppress the PWM signal to the gate of the power MOSFET, wherein, to suppress the PWM signal, the AND gate is configured to suppress the PWM signal to the gate of the power MOSFET; and
if the voltage value associated with the drain of the power MOSFET is not above the threshold voltage value, permit the PWM signal to the gate of the power MOSFET, wherein, to permit the PWM signal, the AND gate is configured to permit the PWM signal to the gate of the power MOSFET.

10. The LLC converter of claim 9, wherein the first circuit includes the second circuit.

11. The LLC converter of claim 9, wherein the power MOSFET is a n-channel power MOSFET.

* * * * *